United States Patent [19]
Sandford, II et al.

[11] Patent Number: 6,021,196
[45] Date of Patent: Feb. 1, 2000

[54] REFERENCE PALETTE EMBEDDING

[75] Inventors: Maxwell T. Sandford, II; Theodore G. Handel, both of Los Alamos, N.Mex.

[73] Assignee: The Regents University of California, Los Alamos, N.Mex.

[21] Appl. No.: 09/085,147

[22] Filed: May 26, 1998

[51] Int. Cl.[7] .............................. G09C 5/00; G06K 9/36
[52] U.S. Cl. .................... 380/4; 380/54; 382/232
[58] Field of Search .......................... 380/4, 54; 382/232, 382/219, 221, 251, 181, 196

[56] References Cited

U.S. PATENT DOCUMENTS

| | | | |
|---|---|---|---|
| 4,949,381 | 8/1990 | Pastor | 380/51 |
| 5,530,751 | 6/1996 | Morris | 380/4 |
| 5,537,223 | 7/1996 | Curry | 358/460 |
| 5,568,570 | 10/1996 | Rabbani | 382/238 |
| 5,636,292 | 6/1997 | Rhoads | 382/232 |
| 5,652,626 | 7/1997 | Kawakami et al. | 348/463 |
| 5,659,726 | 8/1997 | Sandford, II et al. | 707/101 |
| 5,819,289 | 10/1998 | Sandford, II et al. | 707/104 |
| 5,930,369 | 7/1999 | Cox et al. | 380/54 |

OTHER PUBLICATIONS

Walter Bender et al., "Techniques for Data Hiding," in Proceedings of the SPIE, Storage and Retrieval for Image and Video Databases III, vol. 2420, . 164–173, 1995.

Maxwell T. Sandford II et al., "Modular Error Embedding," U.S. Patent Application No. 08/646,837, filed May 8, 1996.

*Primary Examiner*—Gilberto Barron, Jr.
*Attorney, Agent, or Firm*—Milton D. Wyrick

[57] ABSTRACT

A method of embedding auxiliary information into the digital representation of publication quality color-component digital data. The method applies to all digital data for which individual values are represented by discrete numerical values, and for which a corresponding approximation known as a digital reference palette image can be made in terms of a lesser number of discrete digital data values. The invention creates an intermediate, digital, color-component difference image that allows steganographic methods to hide or embed the auxiliary data. The invention secures the auxiliary data from detection and from unauthorized removal or use by means of the digital reference palette image and a steganographic key. By a substantially reverse process, the embedded auxiliary data can be retrieved easily by an authorized user. The invention provides for a means to combine a removable, visible digital watermark with publication quality digital image data.

11 Claims, 6 Drawing Sheets

```
// loop to calculate and store the biased-difference of the Truecolor image
    // difference = 128+(Truecolor - palette)
    // create the Truecolor difference file
    pixelcount = 0L;
    for (i = 0; i < (short)bh.rows; i++) {
        memset(buffer, 0, BYTES_IN_ROW);
        j = TCFile->Read(bufftc, BYTES_IN_ROW);// Truecolor image row
        ASSERT(j == (short)BYTES_IN_ROW);
        bytesread += j;
        j = tape7.Read(buffpal, bytesinrow); // palette-format image row
        ASSERT(j == bytesinrow);

for (j = 0; j < (short)bh.cols; j++) {
            short b_diff, g_diff, r_diff;
            char pixval[3];
            k = *(buffpal + j);
            b_diff = 128 + (short)*(bufftc + j * 3) - (short)colormap[k].b;
            if (colormap[k].b > 250) {
                b_diff = 255;   // don't use maximum palette values
            }
            g_diff = 128 + (short)*(bufftc + j * 3 + 1) - (short)colormap[k].g;
            if (colormap[k].g > 250) {
                g_diff = 255;   // don't use maximum palette values
            }
            r_diff = 128 + (short)*(bufftc + j * 3 + 2) - (short)colormap[k].r;
            if (colormap[k].r > 250) {
                r_diff = 255;   // don't use maximum palette values
            }
```

FIGURE 2A

```
// set pixel to difference only if it is in range of unsigned char
// otherwise flag with a value that is later removed from the pair-key
pixval[0] = pixval[1] = pixval[2] = '\0';
if (b_diff < 255 && b_diff > 0) {
    *(buffer + j * 3) = (unsigned char)b_diff;
} else {
    *(buffer + j * 3) = 0x01;   // flag to mark out-of-range pixel
    pixval[0] = 'b';
}
if (g_diff < 255 && g_diff > 0) {
    *(buffer + j * 3 + 1) = (unsigned char)g_diff;
} else {
    *(buffer + j * 3 + 1) = 0x01;  // flag to mark out-of-range pixel
    pixval[1] = 'g';
}
if (r_diff < 255 && r_diff > 0) {
    *(buffer + j * 3 + 2) = (unsigned char)r_diff;
} else {
    *(buffer + j * 3 + 2) = 0x01;  // flag to mark out-of-range pixel
    pixval[2] = 'r';
}
```

FIGURE 2B

```
// loop to calculate and store the output version of the Truecolor image
   // note:   difference = 128+(Truecolor - palette)
   // hence:  Truecolor  = (difference -128) + palette for (i = 0; i < (short)bh.rows; i++) {
    memset(buffer, 0, BYTES_IN_ROW);
    j = tape6.Read(bufftc, BYTES_IN_ROW);   // difference image row
    ASSERT(j == (short)BYTES_IN_ROW);
    bytesread += j;
    j = tape7.Read(buffpal, bytesinrow);    // palette-format image row
    ASSERT(j == bytesinrow);
    for (j = 0; j < (short)bh.cols; j++) {
        unsigned char b_diff, g_diff, r_diff;
        if (i == 0) {
            memcpy(buffer,bufftc,BYTES_IN_ROW);
            break;    // difference embedding key in 1st row
        }
        k = *(buffpal + j);
        b_diff = *(bufftc + j * 3) -128 + colormap[k].b;
        g_diff = *(bufftc + j * 3 + 1) -128 + colormap[k].g;
        r_diff = *(bufftc + j * 3 + 2) -128 + colormap[k].r;
        *(buffer + j * 3) = b_diff;
        *(buffer + j * 3 + 1) = g_diff;
        *(buffer + j * 3 + 2) = r_diff;
    }
    tape8.Write(buffer, BYTES_IN_ROW); // output one Truecolor image
    row
}
```

FIGURE 3

MakeDifferenceImage();

// open the difference file and extract the pixel_table information

CImageBitmapFile::OpenBitmapFile(tempstr);

ExtractBitmap();

FIGURE 5

REFERENCE PALETTE EMBEDDING

FIELD OF THE INVENTION

The present invention generally relates to digital manipulation of numerical data. More specifically, the invention relates to the embedding of large amounts of external data into the numerical values used to represent a publication quality digital image without altering the appearance of the digital image. This invention was made with Government support under Contract No. W-7405-ENG-36 awarded by the U.S. Department of Energy. The Government has certain rights in the invention.

Many digital representations of image data have resolutions in intensity and color range greater than is required to represent the meaningful content of the information. Digital representations of publication quality images are ordinarily in Truecolor format using eight or more binary bits of information, for each of the three primary colors (red, green, and blue), for a total of at least 24-bit resolution. An alternative publication quality format for digital images uses primary color complements (cyan, yellow, and magenta), and black to represent the image information. The publication quality of Truecolor digital images insures that the all the information necessary to reproduce the original image in print is present in the alternative electronic form. Truecolor digital images are most often the first-generation image data produced by sensors in scanners or electronic cameras capable of recording the highest quality images.

In many situations, fewer than 24 bits resolve an image adequately to convey its meaning and content. Color reduction methods analyze a Truecolor image to determine a smaller number of colors that can be used to reproduce an approximation to the original publication quality image. Color reductions to 256 or fewer colors are used commonly for digital images intended for display in electronic documents or via the Internet worldwide web (www). Images stored in the Compuserve™ Graphics Interchange Format (GIF), the MICROSOFT® Windows Bitmap™ (BMP), and tagged-image file format (TIFF) formats often use a 256-color palette. The color-reduced palette requires 8-bits per picture element (pixel) to approximate the original 24-bits per pixel Truecolor values.

Reference palette embedding is a new steganographic method for manipulating the information in a 24-bits per pixel Truecolor host image, in order to insert auxiliary data with less error than is caused by methods that replace directly some of the 24-bits with the auxiliary data. Reference palette embedding as taught here provides invisibility of the auxiliary information, in comparison with the method disclosed in U.S. Pat. No. 5,686,782 issued Aug. 19, 1996 for DATA EMBEDDING, which is included herein by reference for all purposes.

The reference palette embedding invention guarantees that the auxiliary information placed into the image affects only the parts of the Truecolor image that are redundant, and therefore unnecessary for representing the image content. Methods that manipulate the picture element (pixel) values directly by either the methods taught in the aforementioned DATA EMBEDDING patent, or by the methods taught in U.S. patent application Ser. No. 08/646,837 filed May 8, 1996, for MODULAR ERROR EMBEDDING, also included herein by reference for all purposes, modify significantly the bit values within the image pixel. Hereinafter, the teachings of the above-described U.S. Patent and the above-described U.S. Patent Application will be referred to as DATA EMBEDDING process and MODULAR ERROR EMBEDDING process, respectively. These alternative steganographic methods necessarily affect the image content to some degree. The present invention, reference palette embedding, utilizes a color-reduced version of the Truecolor image as a template to ensure that the embedding process affects the image quality as little as is possible.

Reference palette embedding uses and extends the DATA EMBEDDING process as taught in the above-mentioned U.S. patent. As disclosed in the DATA EMBEDDING patent, the auxiliary data are embedded in a manner that manipulates the noise component of the host data, and that does not modify directly any host data values. In reference palette embedding, as taught herein, the auxiliary data are embedded into the difference between the original Truecolor image, and a color-reduced version of the original image.

The color-reduced image and the digital key taught in the DATA EMBEDDING patent combine to permit the construction of the auxiliary data from the modified Truecolor image.

Data embedded into the host image with the present reference palette embedding invention are recovered by processing the digital image in machine readable, digital form. Human readable versions of images containing auxiliary data, for example images displayed on a screen or printed from the digital data, cannot be processed to recover the embedded information. In a preferred embodiment of the subject invention, the auxiliary data are compressed and encrypted before beginning the reference palette embedding process, in order to randomize the auxiliary bits, and to minimize the effect of the auxiliary data on the difference between the Truecolor and color-palette images.

It is therefore an object of the present invention to provide apparatus and method for embedding data into a digital information stream so that the meaning and content of the digital information stream is not changed significantly.

It is another object of the present invention to provide apparatus and method for concealing auxiliary data within a digital information stream so that the presence of the auxiliary data is not discernible in the digital information stream.

It is yet another object of the present invention to provide apparatus and method for reducing the error caused by the added information, and for thwarting unauthorized access to the auxiliary data embedded into digital information stream.

It is still another object of the present invention to provide apparatus and method for allowing authorized construction of embedded auxiliary data from a digital information stream.

Additional objects, advantages, and novel features of the invention will be set forth in part in the description which follows, and in part will become apparent to those skilled in the art upon examination of the following, or learned by practice of the invention. The objects and advantages of the following, or learned by practice of the invention. The objects and advantages of the invention may be realized and attained by means of the instrumentalities and combinations particularly pointed out in the appended claims.

SUMMARY OF THE INVENTION

In accordance with the purposes of the present invention there is provided a method of embedding auxiliary data into publication quality digital image data represented by a quantity of color-component values for each picture element comprising the steps of reducing the quantity of color-component values of the publication quality digital image data to create a digital reference palette, wherein the digital color palette represents the quantity of color-component values of the publication quality digital image data; creating a digital representation of the auxiliary data as a sequence of individual bit values; creating a color-component digital difference image by numerically combining the publication quality digital image with the digital reference palette image; modifying the color-component digital difference image by combining the auxiliary data and the color-component digital difference image through use of a data embedding method; creating a modified publication quality digital image indiscernibly containing the auxiliary data by combining the modified color-component digital difference image and the digital reference palette image; and outputting the modified publication quality digital image into a file format specified for the modified publication quality digital image.

In a still further aspect of the present invention, and in accordance with its objects and purposes, a method of constructing indiscernible auxiliary data from a machine readable publication quality digital image representation of unrelated and uncorrelated data comprising the steps of generating a digital reference palette image from values and properties contained within the publication quality digital image; creating a color-component digital difference image by numerically combining the digital reference palette image and the publication quality digital image; constructing the auxiliary data by processing the color-component digital difference image with a data embedding construction method; interpreting the auxiliary data in order to obtain or remove content, validation or authentication, or otherwise process the publication quality digital image in order to modify its quality.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 2A and 2B are partial listings of computer code used for calculating the biased difference image color-component values.

FIG. 3 is a partial listing of computer code used for calculating modified Truecolor image pixel color-component values.

FIG. 5 is a partial listing of computer code used for constructing modified difference color-component values.

DETAILED DESCRIPTION

The present invention allows auxiliary data to be embedded into a digital Truecolor host image with less error than is caused by modifying the pixel color-components directly. The reduction in error follows from the technique of of the present invention of embedding auxiliary data into the pixel color-component values constructed from the difference between the Truecolor host image and a reference palette image, which has been constructed from the Truecolor host image. The invention can be understood most easily through reference to the drawings.

Figure 1:
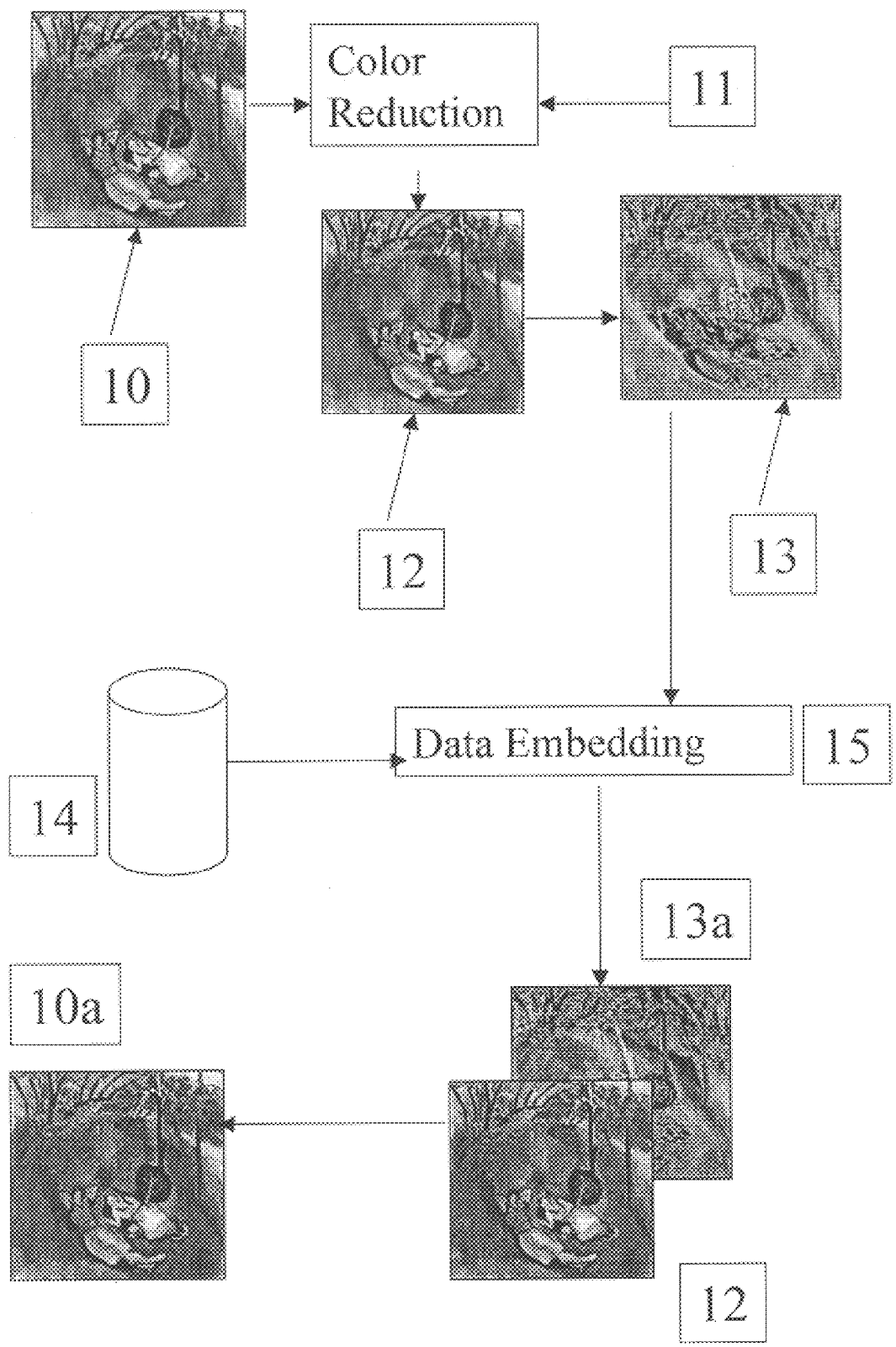
FIG. 1 is a diagram illustrating the reference palette sequence of calculations.

Refer to FIG. 1 for an illustration of the process of the present invention. The images in FIG. 1 are printed digital images, and are not copies of photographs. Publication quality digital image data 10, such as a Truecolor-format image is approximated or reduced by one of several commonly known color-reduction methods 11 to produce a palette-format image 12. The palette-format image 12 is denoted hereinafter as reference palette image 12. The palette colors of reference palette image 12 are subtracted from the Truecolor pixel color values of publication quality digital image 10 to create a difference image 13. The difference-image 13 pixel values measure directly the accuracy of the color-reduction method. Auxiliary data 14 are taken as bits from a data source and input to data embedding processor 15 which may contain the DATA EMBEDDING process, the MODULAR ERROR EMBEDDING process, or any other effective steganographic method for combining auxiliary data 14 with difference image 13. A new difference image 13a is created by data embedding processor 15. The color values of the pixels in the new difference image 13a are added to reference palette image 12, and produce a new, modified publication quality digital image 10a, containing auxiliary data 14.

Examples of appropriate publication quality Truecolor format publication quality digital image data 10 include, but are not limited to, publication quality television or motion picture images, X-ray or Magnetic Resonance Imaging data, digital camera images, and personal security and identification data. Other examples of publication quality digital image data 10 include black and white images containing a range of digital levels of brightness, and digitized analog audio signals. For digitized audio signals, a reduced-quality version of the digitized analog audio signals serves as the reference palette 12.

If the steganographic method used in data embedding processor 15 is bitslicing or the above-mentioned MODULAR ERROR EMBEDDING process, the first embodiment of the present invention is implemented. If the steganographic method used in DATA EMBEDDING processor 15 is the above-mentioned DATA EMBEDDING process, the second embodiment of the present invention is implemented.

The difference image 13 is a Truecolor image, and negative pixel values are not permitted. Hence, the difference D between the Truecolor and pallet-color pixel colors is biased in the positive direction, in order to represent the difference as a positive number within the range 0–255 permitted for an 8-bit Truecolor-format image. The difference value is restricted to the range ±127, in order that the biased value remain within the 8-bit range. Pixels that are found to contain differences larger in absolute value than 127 are flagged, in order that the invention can place the original Truecolor value in modified image 10a. Flagged pixels are not used by the invention. FIG. 2 is a partial listing of computer code in the C++ language that is used for calculating the biased difference image color-component values. FIG. 2 contains two nested loops starting at line 5, over the number of rows in the image, and at line 13, over the number of columns in a row.

The biased color differences are placed into a memory buffer named buffer. Data from a row of Truecolor image pixels are placed into a memory buffer named bufftc in line 7. The TCFile object is an instance of the MICROSOFT® MFC CFile:: class that accesses the bitmap-format Truecolor image. Data from the picture row in the palette-format image is read into a memory buffer named buffpal, from the CFile:: object named tape 7 at line 10, in FIG. 2.

The loop over the columns in the image row that begins at line 13 in FIG. 2 processes the buffered pixel data. The three color-components in the Truecolor image pixel are processed sequentially within this loop. The index k contains the palette-format pixel value. The palette-format pixel colors are accessed by k, into the colormap[ ] array. The Truecolor pixel colors are accessed directly with offsets into the bufftc memory buffer. Color differences having a the value 255 are not used in data embedding processor 15. The biased color differences are $b_{13}$diff, $g_{13}$diff, and $r_{13}$diff calculated at lines 17, 21, and 25. The differences are set to a limiting value (255) if the palette color values are greater than the arbitrary value of 250, i.e. the colors are near the top of their color ranges. The biased color differences are tested for range at lines 35, 41, and 47 in FIG. 2. If the biased difference does not fit into the range0–255 that is allowed by an 8-bit unsigned character, the difference buffer is set to a flag value (0×01). Color differences that were set to the limiting value are flagged in this process. The color difference buffer becomes the output row in the Truecolor difference image.

Returning to FIG. 1, the completed color difference image 13 is combined with auxiliary data 14 by means of data embedding processor 15. In data embedding processor 15 this combination can be accomplished through use of bitslicing techniques, the above-mentioned MODULAR ERROR EMBEDDING process, the above-mentioned DATA EMBEDDING process, or any other effective steganographic algorithm. The color difference image 13 is combined with reference palette image 12 to produce a new, modified Truecolor image 10a.

FIG. 3 is a partial listing of computer code used for calculating biased difference Truecolor-image-pixel color-component values. Two nested loops begin at line 5 and line 12 in FIG. 3. The output buffer for the new, modified Truecolor image pixel row is named buffer. The difference image pixels are read into a memory buffer named bufftc at line 7, from the CFile:: object named tape6. The palette-format pixel values are read into a buffer named buffpal, from the CFile:: object named tape7, at line 10.

Construction of the new Truecolor image pixel row proceeds in the loop over image columns that starts at line 12. The output buffer is filled with the new color-value data. The statements contained in lines 14 through 16 of FIG. 3 process the first row of pixels differently, because the first image row is used to hold the key for the DATA EMBEDDING process. Processing the first row of pixels differently than the rest of the image is not part of the present reference palette embedding invention.

The new Truecolor color-component values are calculated in lines 19, 20, and 21, in FIG. 3. Pixels in the difference image that contained flagged values are calculated incorrectly in this loop. The output buffer offsets are set directly to the new color difference values, and the row of pixels is written to the new Truecolor image using the tape8 file object.

The tape8 image file object is post-processed to replace the flagged pixels with the original Truecolor color-data pixel values. The flagged pixels, i.e. pixels that were not used to contain auxiliary data 14 (FIG. 1), therefore appear without modification in the new Truecolor image 10a (FIG. 1).

Figure 4:
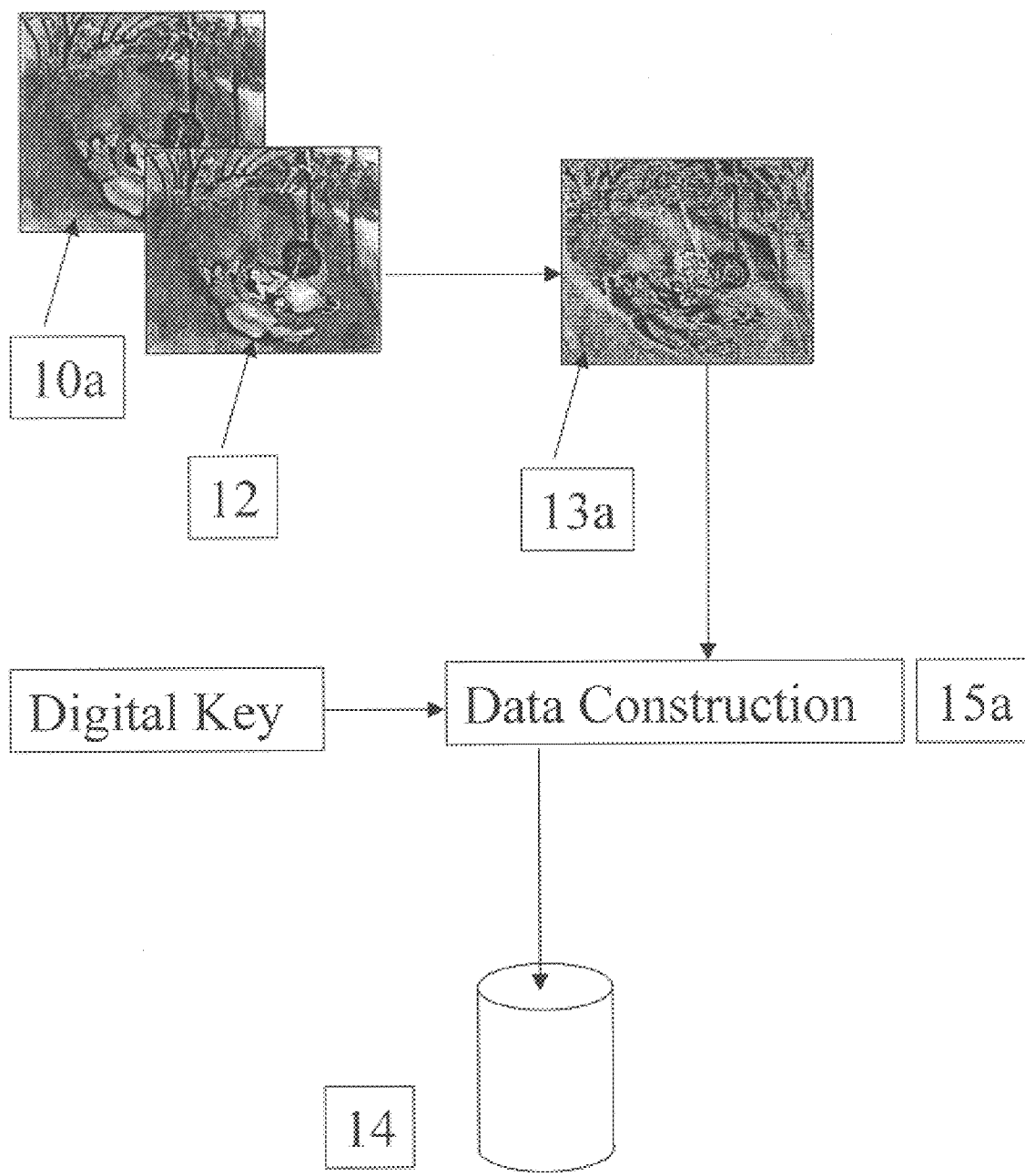
FIG. 4 is a diagram illustrating the sequence of calculation for constructing auxiliary data from a modified Truecolor image.

Constructing (recovering) auxiliary data 14 from new Truecolor image 10a requires the exact reference palette image 12 format version of original Truecolor image 10, and the information necessary to construct auxiliary data 14 from new difference image 13a. FIG. 4 is a diagram illustrating the sequence of calculation for constructing auxiliary data 14 from a modified Truecolor image 10a. As in FIG. 1, the images in FIG. 4 are printed digital images, and are not copies of photographs.

The coding to construct auxiliary data 14, according to the process illustrated in FIG. 4, is shown in FIG. 5. The color difference image 13a is calculated from modified Truecolor image 10a and the reference palette image 12. The digital key is used with the data construction processor 15a to construct auxiliary data 14. The method named MakeDifferenceFile( ) is executed at line 1 in FIG. 5. The MakeDifferenceFile( ) method implements the calculation shown in FIG. 2. The OpenBitmapFile( ) method executed at line 3 prepares the difference image 13a for processing by either the above-mentioned MODULAR ERROR EMBEDDING data construction process or the above-mentioned DATA EMBEDDING data construction process. The ExtractData( ) method executed at line 4 in FIG. 5 constructs the auxiliary data 14 from the appropriate digital key and the difference image 13a.

As with the DATA EMBEDDING process as taught in the above-mentioned U.S. patent, another way of protecting the pair table key taught in that patent is to remove and encrypt it using public-key or another encryption process. The present invention requires the reference palette image 12 as well as the DATA EMBEDDING process key in order to construct auxiliary data 14. The necessary keys for DATA EMBEDDING process or codes for the steganography used to insert auxiliary data 14 into the difference image can be combined with the reference palette image 12 using known and readily available file formats. The COMPUSERVE® Graphic Interchange Format™, the Tagged Image File Format, and the MICROSOFT® bitmap format enable the addition of additional binary information within the file header fields. Thus, the reference palette image 12 serves as the key to construct auxiliary data 14 from a publication quality Truecolor version of the identical picture indiscernibly containing auxiliary data 14.

The foregoing description of the embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of embedding auxiliary data into publication quality digital image data represented by a quantity of color-component values for each picture element comprising the steps of:

reducing said quantity of color-component values of said publication quality digital image data, to create a digital reference palette, wherein said digital color palette represents said quantity of color-component values of said publication quality digital image data;

creating a digital representation of said auxiliary data as a sequence of individual bit values;

creating a color-component digital difference image by numerically combining said publication quality digital image with said digital reference palette image;

modifying said color-component digital difference image by combining said auxiliary data and said color-component digital difference image through use of a data embedding method;

creating a modified publication quality digital image indiscernibly containing said auxiliary data by combining said modified color-component digital difference image and said digital reference palette image; and outputting said modified publication quality digital image into a file format specified for said modified publication quality digital image.

2. The method as described in claim 1 further comprising the step of combining said auxiliary data with predetermined information indicative of the presence of said auxiliary data, its file name, and file size, said step to be performed after the step of digitizing said auxiliary data.

3. The method as described in claim 1 further comprising the step of including an algorithm for removing or hiding a digital watermark signature into said modified publication quality digital image.

4. The method as described in claim 1, wherein said data embedding method comprises a bitslice process.

5. The method as described in claim 1, wherein said publication quality digital image originates from a publication quality black and white image containing a range of digital levels of brightness.

6. The method as described in claim 1, wherein said publication quality digital image originates from a digitized analog audio signal and said reference palette image originates from a reduced-quality version of said digitized audio analog signal.

7. The method as described in claim 1, wherein said publication quality digital image originates from a television signal or motion picture image.

8. The method as described in claim 1, wherein said publication quality digital image originates from X-ray or Magnetic Resonance Imaging data.

9. The method as described in claim 1, wherein said publication quality digital image originates from digitized personal security and identification information.

10. The method as described in claim 1, wherein said publication quality digital image originates from images made with a camera producing digital images.

11. A method of reconstructing indiscernible auxiliary data from a machine readable publication quality digital image representation of unrelated and uncorrelated data comprising the steps of:

generating a digital reference palette image from values and properties contained within said publication quality digital image;

creating a color-component digital difference image by numerically combining said digital reference palette image and said publication quality digital image;

constructing said auxiliary data by processing said color-component digital difference image with a data embedding construction method;

interpreting said auxiliary data in order to obtain or remove content, validate or authenticate, or otherwise process said publication quality digital image in order to modify a auxiliary data quality.

* * * * *